US008944458B1

(12) United States Patent
Ferez et al.

(10) Patent No.: US 8,944,458 B1
(45) Date of Patent: Feb. 3, 2015

(54) ADJUSTABLE WALKER WITH SITTING ASSEMBLY

(71) Applicants: Marcio C. Ferez, Doral, FL (US); Jorge Arturo Delgado, Hialeah, FL (US)

(72) Inventors: Marcio C. Ferez, Doral, FL (US); Jorge Arturo Delgado, Hialeah, FL (US)

( * ) Notice: Subject to any disclaimer, the term of this patent is extended or adjusted under 35 U.S.C. 154(b) by 0 days.

(21) Appl. No.: 14/147,558

(22) Filed: Jan. 5, 2014

(51) Int. Cl.
*B62B 1/00* (2006.01)
*A61H 3/04* (2006.01)

(52) U.S. Cl.
CPC .......................................... *A61H 3/04* (2013.01)
USPC ............ 280/648; 280/87.041; 297/5; 297/93; 135/67

(58) Field of Classification Search
USPC ...................... 280/79.11, 87.021; 135/66, 67; 297/334.12, 334.19, 5, 195.11, 195.1, 297/195.12
See application file for complete search history.

(56) References Cited

U.S. PATENT DOCUMENTS

| | | | | |
|---|---|---|---|---|
| 8,151,812 | B2 * | 4/2012 | Razon | 135/66 |
| 8,573,612 | B1 * | 11/2013 | Fulk et al. | 280/87.021 |
| 2010/0083993 | A1 * | 4/2010 | Vanden Brook | 135/67 |
| 2012/0060877 | A1 * | 3/2012 | Kirby | 135/66 |

* cited by examiner

*Primary Examiner* — John Walters
*Assistant Examiner* — James Triggs
(74) *Attorney, Agent, or Firm* — Sanchelima & Associates, P.A.; Christian Sanchelima, Esq.; Jesus Sanchelima, Esq.

(57) ABSTRACT

A walker having four substantially straight elongate members each having upper and lower ends and a spacer assembly for keeping two elongate members at a parallel and spaced apart relationship with respect to each other. The other two elongate members are each mounted to a handle member defining two spaced apart U-shaped assemblies. A removable seat assembly adjustably positioned at predetermined heights so that a user can walk while seated to relieve his body from the weight stress. Optionally, a reinforcement base assembly is used to provide greater structural support for the walker. The walker can include arm rests and an adjustable frame to cooperate with users of different dimensions. The walker can also be collapsed for storage or transportation purposes using hingedly mounted elongate members and a pivoting U-shape base assembly.

13 Claims, 9 Drawing Sheets

ADJUSTABLE WALKER WITH SITTING ASSEMBLY

BACKGROUND OF THE INVENTION

1. Field of the Invention

The present invention relates to a wheeled walker and, more particularly, to such a walker that includes a sitting assembly.

2. Description of the Related Art

Several designs for wheeled walkers have been designed in the past. Typically, these wheeled walkers are pushed by the user and serve as structural support for the infirm. Their function, however, is limited to providing forward support. Nothing prevents a user from falling back. The present invention provides all-around support to a user. None of the walkers in the prior art, however, include a sitting assembly that permits a user to use his or her legs to move about while remaining seated, or partially seated, thereby reducing the load transmitted to a user's joints. Additionally, none of the walkers in the prior art provide for underarm supports that work in conjunction with a sitting assembly to help a user support his or her body weight.

No other walker known to the Applicants describing the closest subject matter provide for a number of more or less complicated features that fail to solve the problem in an efficient and economical way. None of these walkers suggest the novel features of the present invention.

SUMMARY OF THE INVENTION

It is one of the main objects of the present invention to provide a walker that supports a user and allows him or her to move around with his or her legs while optionally being seated, or partially seated, thereby reducing the load stress on a user's joints, spine, and feet.

It is another object of this invention to assist those affected by pulmonary emphysema who have difficulty moving their own weight thus alleviating shortness of breath in addition to those with chronic heart failure that require moderate rehabilitating physical exercise. The present invention will also facilitate movement for those afflicted with other medical conditions including hemiplegia with difficulties using half of their bodies.

It is yet another object of the invention to provide a walker with a sitting assembly that is adjustable and collapsible for a user to use comfortably and store more readily.

It is still another object of the present invention to provide a walker that is secure and structurally stable to provide effective support to a user.

It is yet another object of this invention to provide such a walker that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
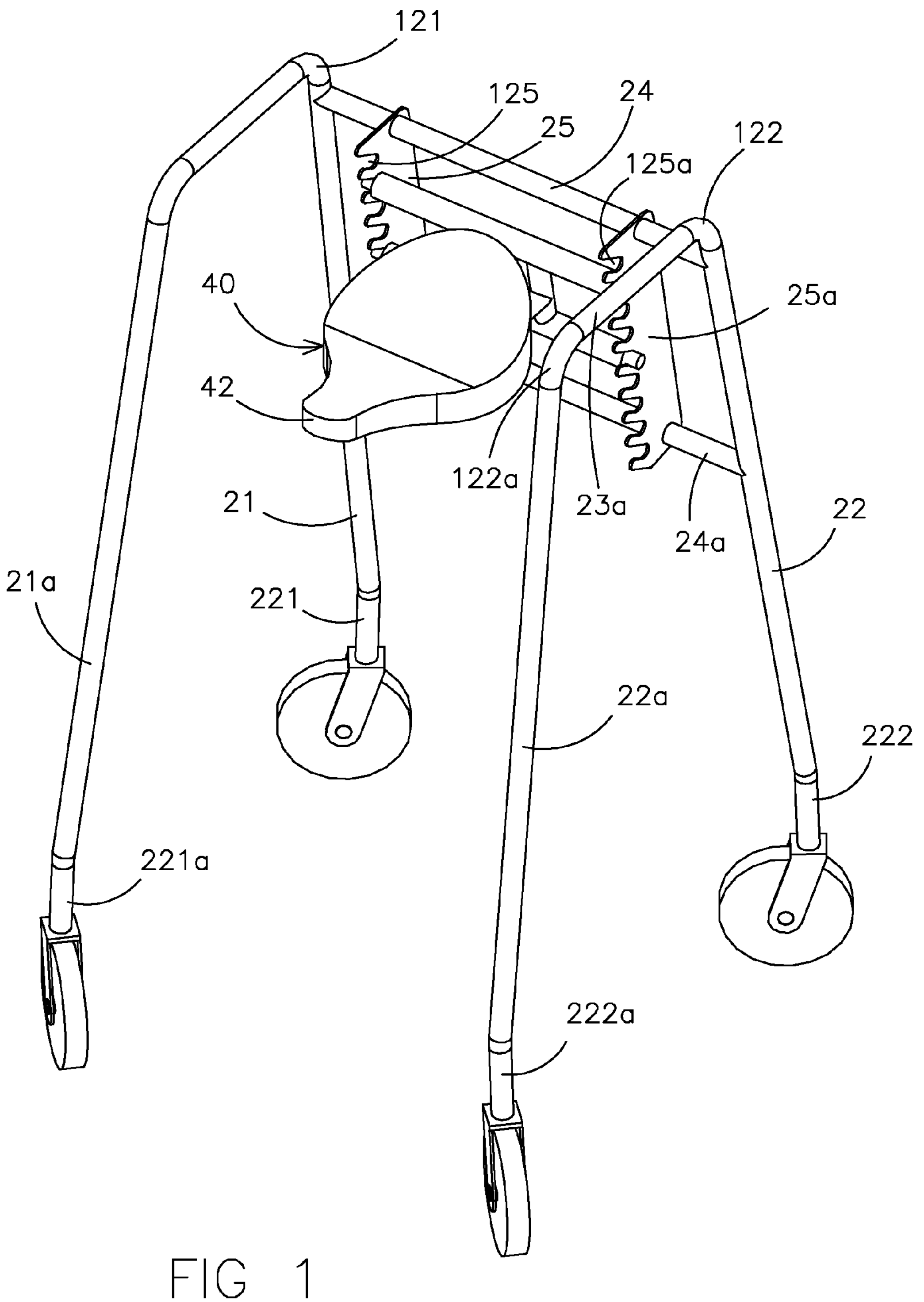
FIG. 1 represents an isometric view of one of the embodiments for the present invention.

Referring now to the drawings, where the present invention is generally referred to with numeral 10, it can be observed that it basically includes frame assembly 20, supporting seat assembly 40 therein, and base assembly 60.

As seen in FIG. 1, frame assembly 20 includes four elongate members 21; 21*a*; 22; 22*a* with lower angled ends 221; 221*a*; 222; 222*a* and upper curved ends 121; 121*a*; 122; 122*a*. Upper ends 121; 121*a* connected to each other through handle member 23 mounted thereto. Upper ends 122; 122*a* connected to each other through handle member 23*a* mounted thereto. One extreme of lower ends 221; 221*a*; 222; 222*a* are mounted to the distal ends of elongate members 21; 21*a*; 22; 22*a* so that the former extend perpendicularly with respect to a supporting substantial horizontal surface (not shown). The other extreme of lower angled ends 221; 221*a*; 222; 222*a* are mounted to wheel members 27; 27*a*; 28; 28*a*, respectively. Ends 121; 121*a* of elongate members 21; 21*a* are mounted to handle member 23 creating a substantially U-shaped structure.

Similarly, the connection of ends 122; 122*a* of elongate members 22; 22*a* mounted to handle member 23*a* also creates a substantially U-shaped structure. Members 21; 21*a*; 22 and 22*a* extend downwardly and outwardly from handle members 23; 23*a* to provide stability to walker 10 without unreasonably increasing its footprint. In the embodiment shown in FIGS. 2 and 3, handle members 23; 23*a* include hinge members 123 and 123*a*, respectively, and they are respectively mounted to the upper ends of members 21*a* and 22*a*, respectively. This permits a user to retract members 21*a* and 22*a* towards members 21 and 22, respectively, to achieve a smaller volumetric disposition.

Also shown in FIG. 1, frame assembly 20 includes spacer members 24; 24*a* that are substantially perpendicularly to elongate members 21; 22 keeping the latter at a spaced apart relationship with respect to each other. Frame assembly 20 also includes seat adjustment brackets 25; 25*a* mounted substantially perpendicularly to spacer members 24; 24*a* and kept at a spaced apart relationship with respect to each other. Seat adjustment brackets 25; 25*a* include a plurality of cooperatively aligned slots 125; 125*a* that removably receive adjustment bar members 41; 41*a* of seat assembly 40. A user can adjust the height of seat member 42 to his/her needs. Other implementations for this seat height adjustment mechanism can be implemented. The objective being to provide a seating support to a user's buttocks while allowing him or her to walk. Selecting the proper height for ergonomically designed seat member 42 allows a user to accomplish this.

Figure 2:
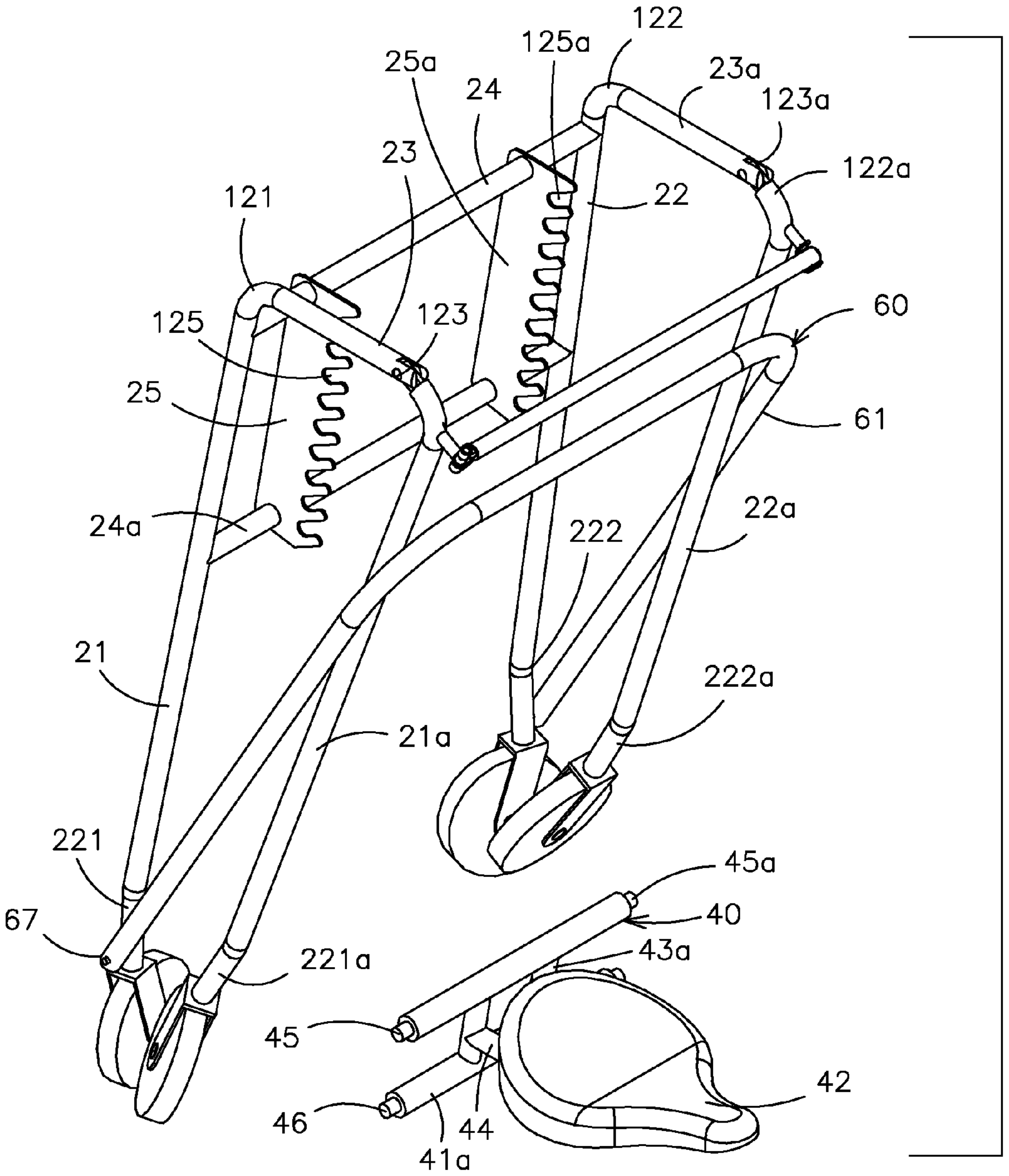
FIG. 2 shows an isometric view of the embodiment shown in the previous figure with base assembly 60 added, in collapsed state, with seat assembly 40 removed from seat attachment brackets 25; 25*a*.
Figure 3:
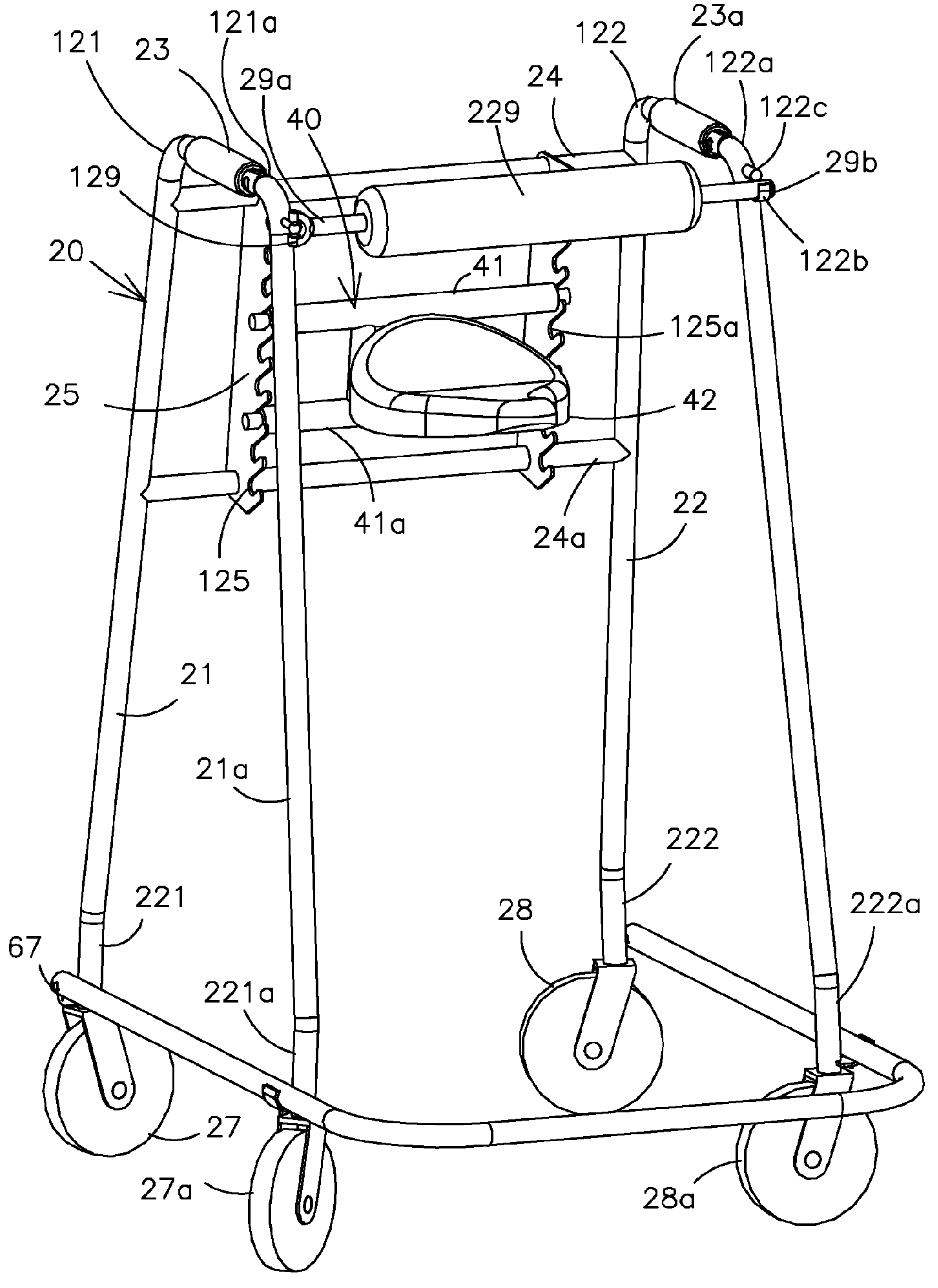
FIG. 3 shows an isometric view of the embodiment shown in the previous figure showing base and seat assemblies 60 and 40 mounted thereon.

As seen in FIGS. 2 and 3, walker 10 can also include base assembly 60 to enhance its structural stability. Base assembly 60 includes, in the embodiment shown in the figures, and best seen in FIG. 3, elongate base members 61; 61*a* and 61*b* that are connected together through curved base members 69; 69*b*, defining a substantial U-shape base assembly 60. Pivoting pins 67; 67 mount elongate base members 61; 61*a* to lower angled members 221; 222, respectively. This permits the distal ends (of members 61; 61*a*) of U-shape assembly 60 to swing or pivot to a retracted configuration for volumetric efficient storage and/or transportation.

Frame assembly 20 optionally includes support arm 29 that a user can hold for greater support while using the present invention. Support arm 29 includes ends 29*a*, 29*b*. Universal joint 129 is mounted to upper end 121*a* and to end 29*a* to allow arm 29 to move vertically and horizontally. Upper end 122*a* includes hook 122*b* and spring loaded pin 122*c*. Hook 122*b* supports opposite distal end 29*b* of arm 29. Pin 122*c* prevents arm 29 from being unintentionally raised by requiring a user to cammingly overcome spring loaded pin 122*c* with a force of a predetermined magnitude before end 29*b* is dislodged. As seen in FIG. 3, cushion 229 provides comfort to a user when leaning on support arm 29.

As best seen in FIGS. 2 and 3, spacer support members 43; 43*a* are perpendicularly mounted to bar members 41; 41*a* keeping the latter at a parallel and spaced apart relationship with respect to each other. Seat attachment members 44; 44*a* are mounted to members 43; 43*a* at one of their respective ends and to seat member 42 at the other ends. This allows a user to adjust the height of seat member 42 relative to a supporting horizontal surface for a user to walk on.

Frame assembly 20 includes an unobstructed inner space 12 where a user is seated substantially at the center to provide maximum support and protection from falling. Seat member 42 is positioned to bring a user's projected center of gravity approximately to the center of inner space 12. The compromise of keeping the vertical projection of the user/walker center of gravity (for all possible positions of a user) within the four wheels' points of contact with a supporting surface will be determined by the practicalities of keeping the walker's footprint dimensions within reason.

As shown in FIG. 2, seat assembly 40 includes seat member 42, seat attachment members 44; 44*a*; perpendicularly mounted spacer members 43; 43*a*, and seat adjustment members 41; 41*a*. Seat member 42 has an ergonomic shape to allow a user to readily stand up, if desired. Seat attachment members 44; 44*a* are rigidly mounted to seat member 42 and also to spacer support members 43; 43*a*. Support members 43; 43*a* are perpendicularly mounted to seat adjustment members 41; 41*a*. Adjustment member 41 includes engagement pins 45; 45*a* at its distal ends which are cooperatively received by slots 125; 125*a* to allow a user to selectively place seat 42 at a predetermined location. Similarly, adjustment member 41*a* includes engagement pins 46; 46*a* at its distal ends to also cooperatively be received by slots 125; 125*a*. This provides a secure positioning of seat member 42. Other equivalent mechanisms for providing a secure positioning of seat member 42 within inner space 12 can be used.

As shown in FIG. 2, member 61; 61*a* are pivotally mounted to lower ends 221; 222 through pivoting pins 67; 67*a*, respectively that allow U-shaped base assembly 60 to pivot upwardly when walker 10 is collapsed for storage or to pivot downwardly when the walker is assembled for use. Base support members 127*a* and 128*a* are rigidly mounted to base support members 221*a* and 222*a* to cooperatively coact with members 61 and 61*a*, to support the latter when base assembly 60 is assembled, as seen in FIG. 3.

Figure 4:
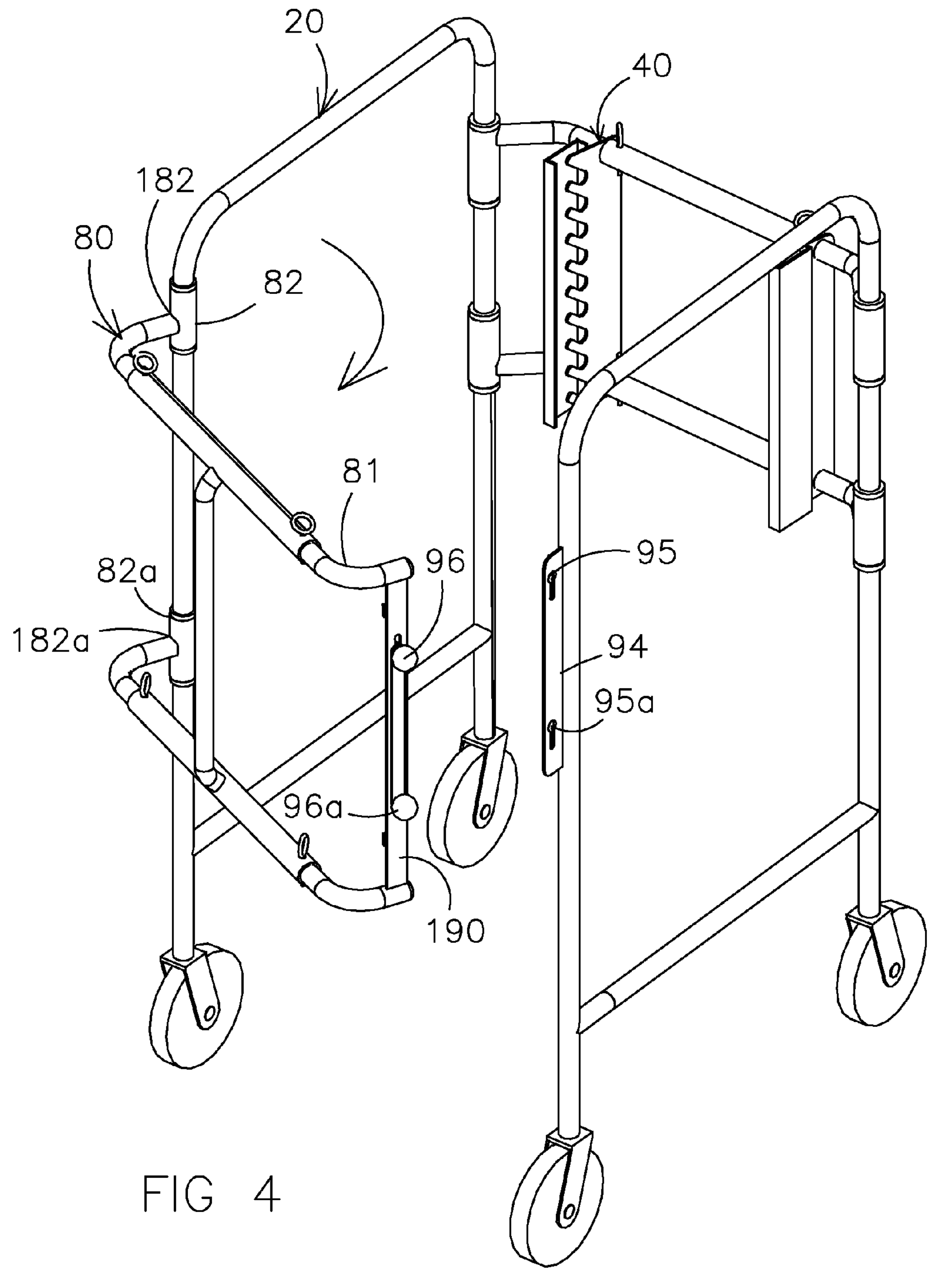
FIG. 4 shows an isometric view of an alternate embodiment with gate assembly 80 released from connection plate 94.

In an alternate embodiment shown in FIG. 4, gate assembly 80 is mounted to frame assembly 20 and is used to adjust the dimensions of the walker to suit users of varying proportions. Gate assembly 80 can be widened, narrowed, lengthened, or shortened with respect seat assembly 40 depending on a user's dimensions and because gate assembly 80 is mounted to frame assembly 20 any adjustment to the dimensions of gate assembly 80 are cooperatively transferred to the dimensions of frame assembly 20. As seen in FIG. 4, gate assembly 20 includes gate 81. Gate 81 includes hinge connectors 82; 82*a* at distal ends 182; 182*a*, respectively, that hingedly mount gate 81 to frame assembly 20 allowing gate 81 to open to allow a user to access seat assembly 40. As seen in FIGS. 5A and 5B, hinge connectors 82; 82*a* are perpendicularly mounted to lengthening sleeves 83; 83*a* that receive first ends 84; 84*a* of adjustment members 85; 85*a*.

First ends 84; 84*a* include a plurality of lengthening through holes 186; 186*a* that a user selectively matches with lengthening sleeve through holes 87; 87*a* of lengthening sleeves 83; 83*a* and secures with pins 88; 88*a* to adjust the length of one side of gate assembly 80 with respect to seat assembly 40. This lengthening means on one end of gate 81 works cooperatively with lengthening means on the second end of gate 81 to fully and substantially symmetrically lengthen gate assembly 80 with respect to seat assembly 40 allowing a user to more comfortably fit in the walker.

Figure 4A:
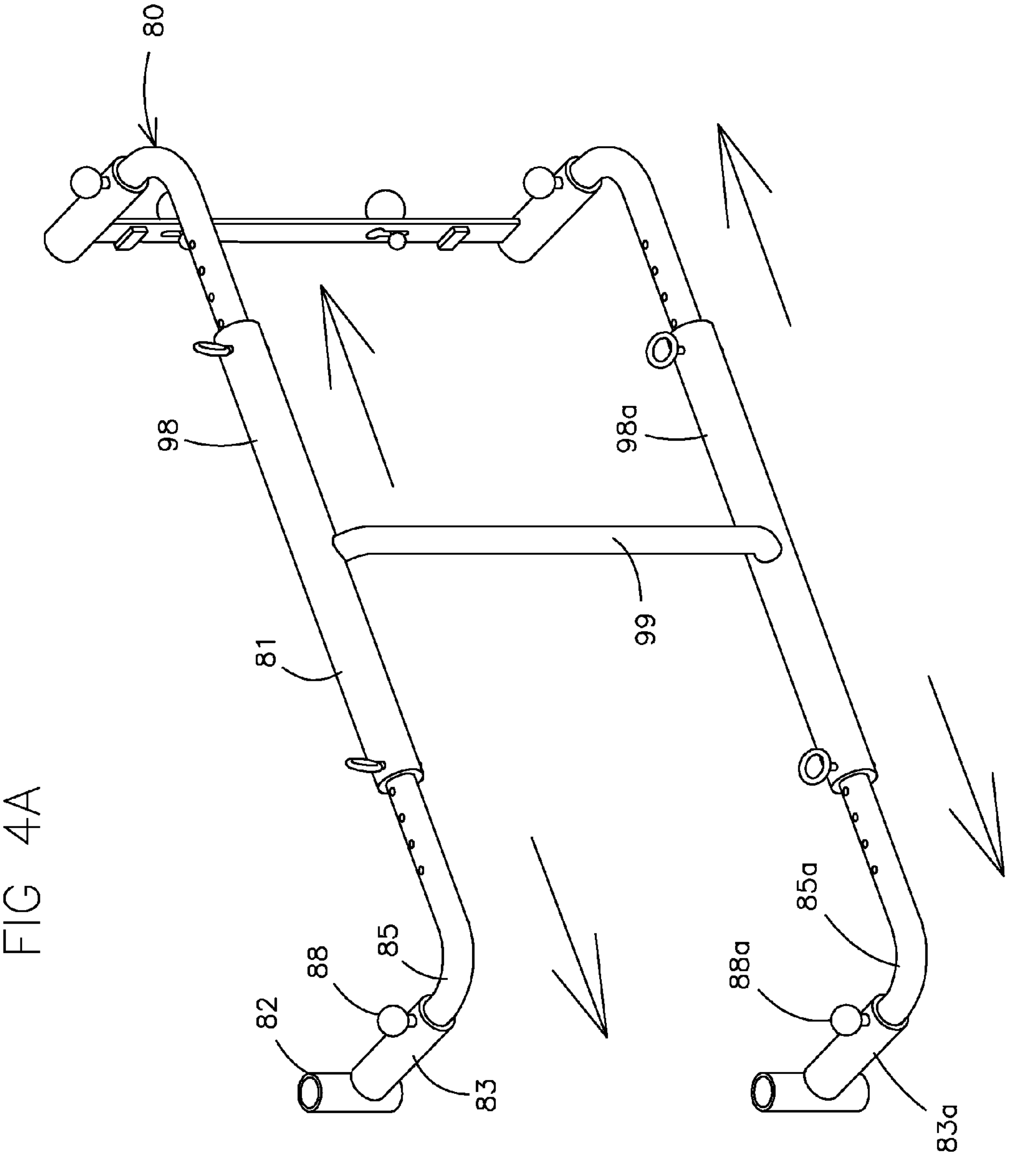
FIG. 4A represents an isometric view of gate assembly 80 shown in the previous figure where adjustment members 85; 85*a*; 91; 91*a* have been pulled away from sleeves 98; 98*a* to widen gate assembly 80.
Figure 4B:
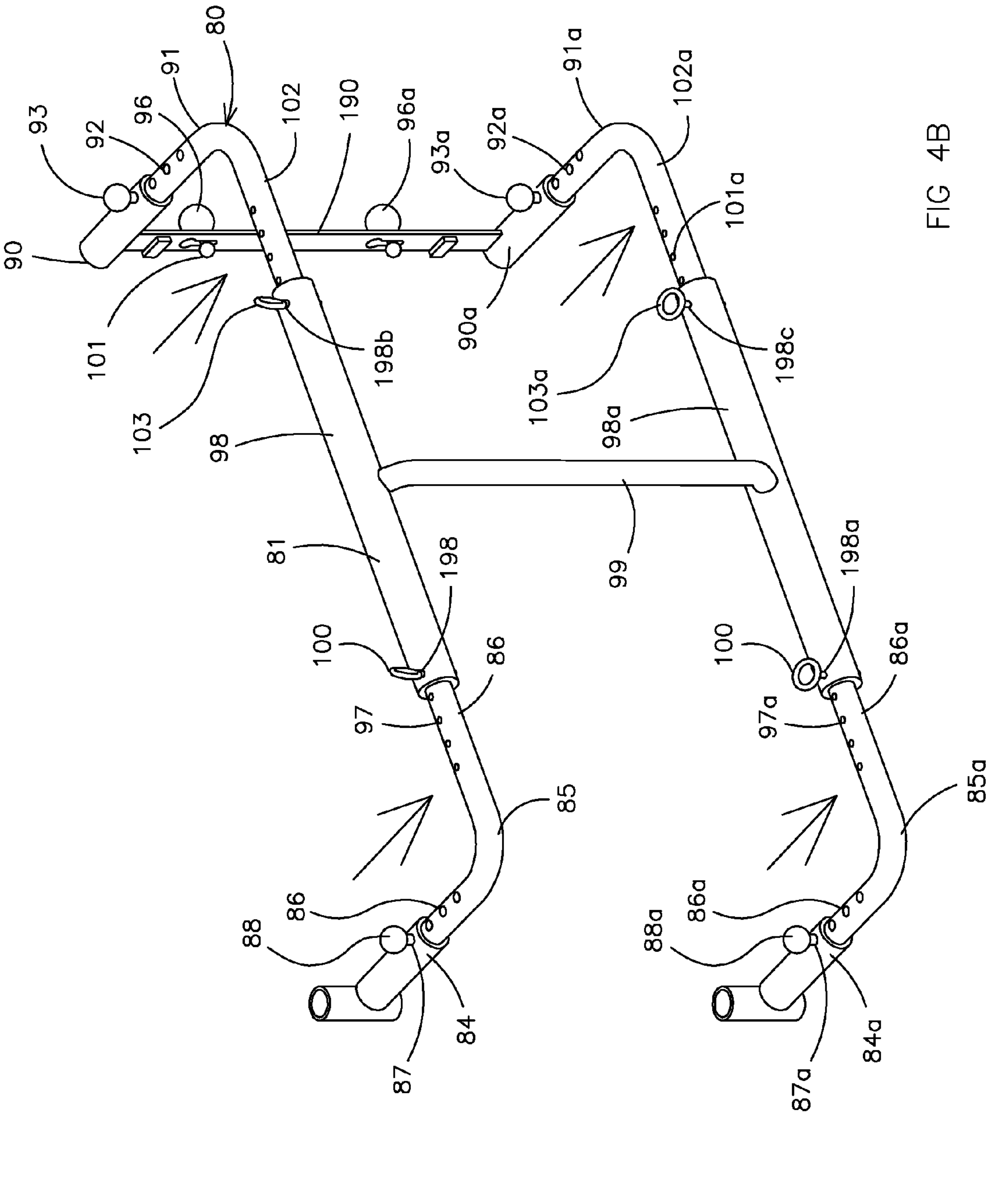
FIG. 4B depicts an isometric view of gate assembly 80 shown in the previous figure wherein adjustment members 85; 85*a*; 91; 91*a* have been pulled away from sleeves 98; 98*a* to widen gate assembly 80. Additionally, adjustment members 85; 85*a*; 91; 91*a* have been pulled away from lengthening sleeves 83; 83*a*; 90; 90*a*, respectively, to lengthen gate assembly 80 with respect to seat assembly 40 (not shown).

As seen in FIGS. 4A and 4B, the second end of gate 81 includes lengthening sleeves 90; 90*a* that are kept at a parallel and spaced apart relationship with respect to each other by spacer bar 190. As seen in FIG. 4, spacer bar 190 includes pins 96; 96*a* that are used to mount spacer bar 190 to frame assembly 20 through connection plate 94. Connection plate 94 also includes two spaced apart openings 95; 95*a* that receive pins 96; 96*a* to mount the second end of gate 81 to elongate member 21*a* of frame assembly 20. The lengthening means on the second end of gate 81 includes lengthening sleeves 90; 90*a* that a user adjusts with respect to adjustment members 91; 91*a* using lengthening through holes 92; 92*a* to set the length of the second end of gate assembly 80 with respect to seat assembly 40. Once the desired dimension is selected, a user inserts pins 93; 93*a* through corresponding lengthening through holes 92; 92*a* to secure gate assembly 80 at the desired length.

Adjustment members 85; 85*a* include second ends 86; 86*a* that further include widening through holes 97; 97*a*. Gate 81 further includes two widening adjustment sleeves 98; 98*a*, having sleeve through holes 198; 198*a*; 198*b*; 198*c* and kept at a parallel and spaced apart relationship with respect to each other by spacer member 99, that is perpendicularly mounted to each widening adjustment sleeve 98; 98*a*, as best seen in FIGS. 4A and 4B. Second ends 86; 86*a* are inserted into adjustment sleeves 98; 98*a* and mounted thereon by a user passing pins 100; 100*a* through sleeve through holes 198; 198*a* and preselected widening through holes 97; 97*a*, respectively. The width of the first side of gate 81 is determined by the widening through holes 97; 97*a* that a user selects.

Similarly, the second side of gate 81 can be cooperatively widened by a user using widening through holes 101; 101*a* on distal ends 102; 102*a* of adjustment members 91; 91*a*. A user can pull adjustment members 91; 91*a* out of sleeves 98; 98*a* until a desired width is reached and then secure gate 81 at that dimension by passing pins 103; 103*a* through sleeve through holes 198*b*; 198*c* and widening through holes 101; 101*a*, respectively.

Figure 5:
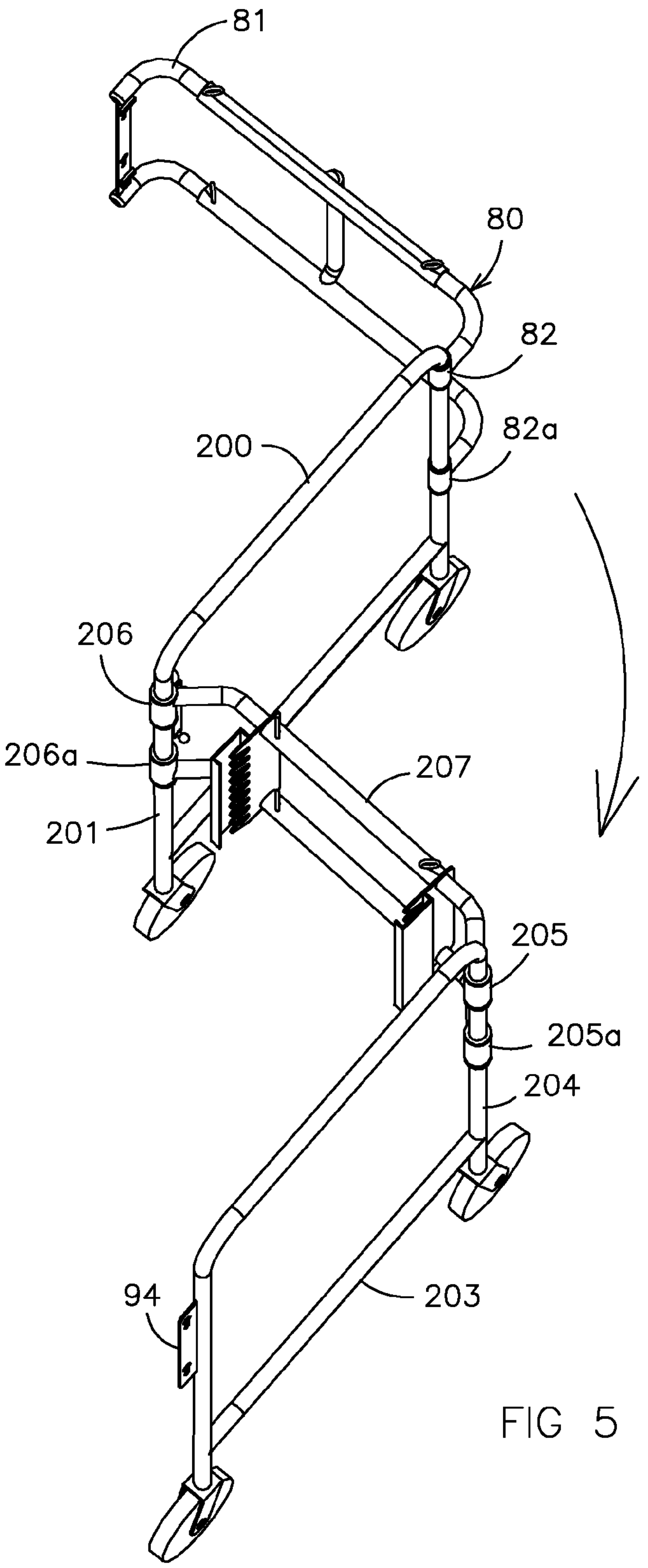
FIG. 5 illustrates an isometric top view of the alternate embodiment shown in FIGS. 4; 4A and 4B wherein frame 200 has been rotated around elongate member 201 in preparation to collapse and store the walker.

As shown in FIG. 5, another alternate embodiment can be collapsed and folded for storage. In this embodiment when gate 81 is released from connection plate 94 frame member 200 can rotate 270 degrees around elongate member 201 using hinge connectors 206; 206*a*. Then, frame member 200 can be brought adjacent to frame member 207. Subsequently, gate 81 can be rotated 90 degrees around frame member 200 using hinge connectors 82; 82*a* to be brought adjacent to frame member 200. Frame member 203 then rotates 90 degrees around elongate member 204 using hinge connectors 205; 205*a* to be brought adjacent to frame member 207 as frame member 200.

Figure 6:
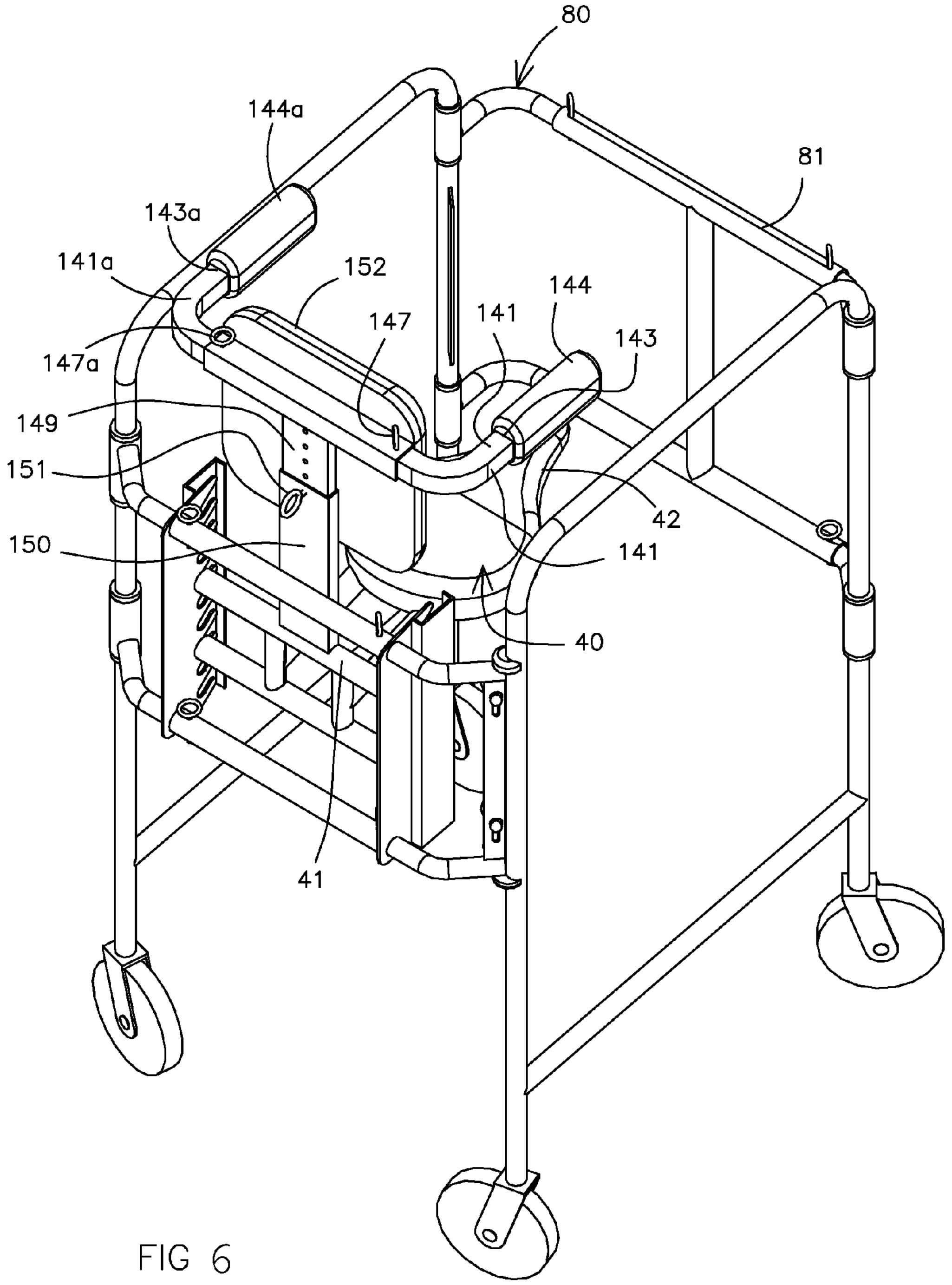
FIG. 6 shows an isometric view of a walker with an alternate embodiment for seat assembly 40 including armrest supports 141; 141*a*.
Figure 6B:
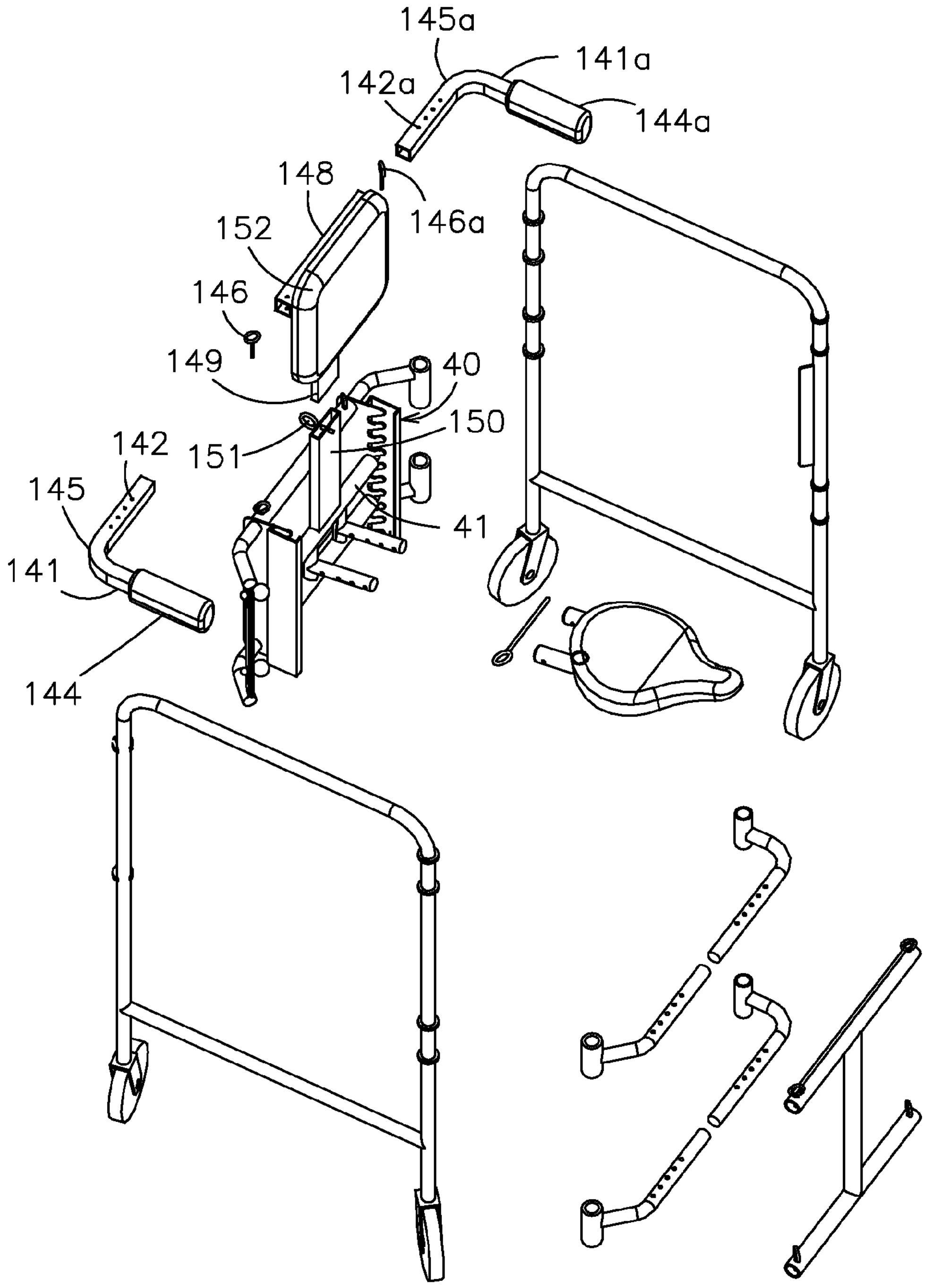
FIG. 6B represents an exploded isometric view of the alternate embodiment showing the plurality of through holes 142; 142*a* used to adjust the dimensions of armrest supports 141; 141*a* shown in the previous figure.

In an alternative embodiment shown in FIGS. 6 and 6A, seat assembly 40 can include armrest supports 141; 141*a* to provide an additional means for a user to partially support his or her body weight. Additionally, the height of armrest supports 141; 141*a* with respect to seat 42 can be adjusted as seen in FIG. 6. At first ends 143; 143*a* armrest supports 141; 141*a* include cushions 144; 144*a* to provide a comfortable surface for a user to rest on. As shown in FIG. 6A, second ends 145; 145*a* include a plurality of through holes 142; 142*a* that cooperatively allow pins 146; 146*a* to pass through armrest sleeve through holes 147; 147*a* of armrest sleeve 148 to mount armrest supports 141; 141*a* to seat assembly 40. Armrest sleeve is mounted to armrest headrest 152 and perpendicularly to height adjustment member 149 that is mounted to height adjustment sleeve 150 using pin 151 that a user selectively inserts into one of height through holes 153 based on the preferred height for armrest supports 141; 141*a* with respect to seat assembly 40. Height adjustment sleeve 150 is perpendicularly mounted to adjustment member 41.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A walker comprising:

A) a structural frame having first, second, third and fourth elongate members each having an upper end and a lower end, said frame further includes a first handle member connecting the first ends of said first and second elongate members and a second handle member connecting the first ends of said third and fourth elongate members, defining first and second U-shape assemblies, respectively, said frame further including spacer assembly mounted to said first and second U-shape assemblies keeping the latter at a spaced apart relationship with respect to each other and defining an unobstructed inner space between said first and second U-shape assemblies;

B) a seat assembly and cooperatively mounted to said spacer assembly having an ergonomically designed seat member positioned within said inner space at a predetermined distance from a substantially horizontal surface a user to sit on said seat member while walking over said surface thereby relieving, partially or totally his or her weight load;

C) four wheel assemblies, each mounted to each of said lower ends allowing said walker to move on said surface; and D) said frame includes a height adjustment assembly for keeping said seat assembly at a selectively predetermined distance from said surfaces.

2. The walker set forth in claim 1 further including a support arm member having first and second ends, said first end being pivotally mounted to said first U-shape assembly at a location opposite to and at a spaced apart relationship with respect to said spacer assembly and said second end removably and selectively locked to said second U-shape assembly.

3. The walker set forth in claim 1 further including:

E) a reinforcement base assembly structurally mounted to said lower ends around the periphery of said inner space.

4. The walker set forth in claim 3 wherein said reinforcement base assembly has a substantially U-shape with distal ends pivotally mounted to said first and third elongate members at a predetermined distance from their respective lower ends.

5. The walker set forth in claim 4 wherein said second U-shape assembly includes a hook for receiving said second end and a cammingly actuated spring loaded pin cooperatively mounted above said hood for selectively and removably locking said second end in place.

6. A walker comprising:

A) a structural frame having first, second, third and fourth elongate members outwardly extending and each having an upper end and a lower angled end positioned perpendicularly to a supporting substantially horizontal surface, said frame further includes a first handle member connecting the first ends of said first and second elongate members and a second handle member connecting the first ends of said third and fourth elongate members, defining first and second U-shape assemblies, respectively, said frame further including spacer assembly mounted to said first and second U-shape assemblies keeping the latter at a spaced apart relationship with respect to each other and defining an unobstructed inner space between said first and second U-shape assemblies;

B) a seat assembly and cooperatively mounted to said spacer assembly having an ergonomically designed seat member positioned within said inner space at a predetermined distance from a substantially horizontal surface a user to sit on said seat member while walking over said surface thereby relieving, partially or totally his or her weight load;

C) four wheel assemblies, each mounted to each of said lower angled ends allowing said walker to move on said surface;

D) a support arm member having first and seconds ends, said first end being pivotally mounted to said first U-shape assembly at a location opposite to and at a spaced apart relationship with respect to said spacer assembly and said second end removably and selectively locked to said second U-shape assembly;

E) said second U-shape assembly includes a hook for receiving said second end and a cammingly actuated spring loaded pin cooperatively mounted above said hood for selectively and removably locking said second end in place.

7. The walker set forth in claim 6 wherein said frame includes a height adjustment assembly for keeping said seat assembly at a selectively predetermined distance from said surfaces.

8. The walker set forth in claim 7 further including:

E) a reinforcement base assembly structurally mounted to said lower ends around the periphery of said inner space.

9. The walker set forth in claim 8 wherein said reinforcement base assembly has a substantially U-shape with distal ends pivotally mounted to said first and third elongate members at a predetermined distance from their respective lower ends.

10. The walker set forth in claim 1 further including a gate assembly having first and second sides, said first side being hingedly mounted to said second elongate member.

11. The walker set forth in claim 10 wherein said gate assembly includes cooperative widening and lengthening sleeves for selectively adjusting the distance between said seat assembly, and the width of said gate can also be selectively adjusted, thereby also adjusting the width of said structural frame mounted thereon.

12. The walker set forth in claim 1 further including armrests mounted to said seat assembly.

13. The walker set forth in claim 12 wherein the height of said armrests can be adjusted with respect to said supporting surface.

* * * * *